United States Patent [19]
Horiuchi

[11] Patent Number: 6,125,869
[45] Date of Patent: Oct. 3, 2000

[54] SELF-DIAGNOSIS METHOD FOR MASS FLOW CONTROLLER

[75] Inventor: Toru Horiuchi, Higashimurayama, Japan

[73] Assignee: SMC Kabushiki Kaisha, Tokyo, Japan

[21] Appl. No.: 09/231,773

[22] Filed: Jan. 15, 1999

[30] Foreign Application Priority Data

Jan. 19, 1998 [JP] Japan .................................. 10-007579

[51] Int. Cl.[7] .................................................. F16K 31/12
[52] U.S. Cl. ................................ 137/1; 137/486; 73/1.35
[58] Field of Search .................................. 137/486, 334, 137/1; 73/1.35, 1.26, 1.16

[56] References Cited

U.S. PATENT DOCUMENTS

| | | | |
|---|---|---|---|
| 4,672,997 | 6/1987 | Landis et al. | 137/554 |
| 4,977,916 | 12/1990 | Ohmi et al. | 137/8 |
| 5,062,446 | 11/1991 | Anderson | 137/468 |
| 5,394,755 | 3/1995 | Sudo et al. | 73/861 |
| 5,744,695 | 4/1998 | Forbes | 73/1.35 |
| 5,762,086 | 6/1998 | Ollivier | 137/1 |
| 5,868,159 | 2/1999 | Loan et al. | 137/334 |

FOREIGN PATENT DOCUMENTS 7-281760  10/1995  Japan .

*Primary Examiner*—Gregory L. Huson
*Assistant Examiner*—Ramesh Krishnamurthy
*Attorney, Agent, or Firm*—Oblon, Spivak, McClelland, Maier & Neustadt, P.C.

[57] ABSTRACT

Disclosed is a self-diagnosis method for a mass flow controller comprising a pressure control valve, a first shut off valve for performing opening/closing operation on an inflow side of the pressure control valve, an orifice disposed on an outflow side of the pressure control valve, a pressure sensor for detecting an inflow side pressure of the orifice, and a second shut off valve for performing opening/closing operation on an outflow side of the orifice. The first shut off valve is in an open state and the second shut off valve is in a closed state while the pressure control valve is in a fully open state so that a previously determined gas having a predetermined pressure is charged via the first shut off valve into a pipework ranging from the first shut off valve to the second shut off valve. Subsequently, the first shut off valve is in a closed state and the second shut off valve is in an open state so that the gas charged in the pipework is allowed to cause outflow. Diagnosis is performed for the mass flow controller on the basis of a period of time required to lower a detection pressure detected by the pressure sensor to a previously determined detection pressure as a result of the outflow. This self-diagnosis process requires no hardware to be newly added, other than hardware necessary for ordinary operation of the mass flow controller.

4 Claims, 5 Drawing Sheets

SELF-DIAGNOSIS METHOD FOR MASS FLOW CONTROLLER

BACKGROUND OF THE INVENTION

1. Field of the Invention

The present invention relates to a self-diagnosis method for a mass flow controller. In particular, the present invention relates to a self-diagnosis method for a mass flow controller, which makes it possible to diagnose the state of change in gas flow rate in the mass flow controller while being assembled in the system.

2. Description of the Related Art

For example, the apparatus for producing thin films and the apparatus for dry etching, which are used in the process for producing semiconductors, require precise control of the flow rate of the process gas fed to the process equipment. Therefore, a mass flow controller is inserted into the pipework for supplying the process gas to the process equipment in order to control the flow rate of the process gas. The gas flow rate is set by adjusting the control voltage applied to the control valve of the mass flow controller.

However, the mass flow controller is equipped in order to control the gas flow rate. Therefore, the mass flow controller includes thin tube components such as an orifice disposed at its inside. When the process gas is, for example, a gas which causes deposition of solid matters, the solid matters deposit in the pipework or in the mass flow controller along with the passage of time as the process gas passes therethrough. As a result, a situation occurs, in which the effective cross-sectional area of the pipework in the mass flow controller is substantially decreased.

In such a situation, any change occurs in the relationship between the control voltage applied to the mass flow controller and the gas flow rate corresponding to the control voltage. The flow rate of the gas passing through the mass flow controller changes even when the control voltage is not altered. Consequently, the state of the process gas undergoes occurrence of change.

Further, if the control is continued in the state in which the effective cross-sectional area of the pipework is decreased in the mass flow controller, particles which result from the solid matters flow out to the process equipment together with the process gas. As a result, any inconvenience arises in the process equipment.

Therefore, it is desired to measure the flow rate of the mass flow controller. A system is known to examine the absolute flow rate of the mass flow controller as disclosed, for example, in Japanese Laid-Open Patent Publication No. 7-281760. That is, when the absolute flow rate of the mass flow controller is examined, the process gas is introduced from a process gas supply source via a shut off valve to a measuring tank. The process gas, which has been introduced into the measuring tank, is supplied to the process equipment via the mass flow controller. A pressure sensor is provided to measure the pressure at an input end of the mass flow controller. The introduction of the process gas into the measuring tank is shut off by closing the shut off valve. The process gas, which has been accumulated in the measuring tank, is allowed to flow to the mass flow controller. Simultaneously, the pressure sensor is used to detect the pressure on the inflow side of the mass flow controller to measure the period of time until the detection pressure detected by the pressure sensor is lowered to a predetermined value. The absolute flow rate of the mass flow controller is examined on the basis of the measured time and the volume of the measuring tank.

However, when the measurement is performed in accordance with the conventional examination method as described above, the following problem arises. That is, in addition to the mass flow control system arranged for the ordinary operation, it is necessary to equip, for example, the measuring tank, the pressure sensor, and the shut off valve to perform the examination.

SUMMARY OF THE INVENTION

The present invention has been made in order to dissolve the problem as described above, an object of which is to provide a self-diagnosis method for a mass flow controller which requires no hardware to be newly added to perform self-diagnosis.

Another object of the present invention is to provide a self-diagnosis method for a mass flow controller, which makes it possible to perform self-diagnosis for the mass flow controller by controlling the opening/closing timing of a shut off valve for controlling the shut off and the passage of a process gas used for ordinary operation of the mass flow controller.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
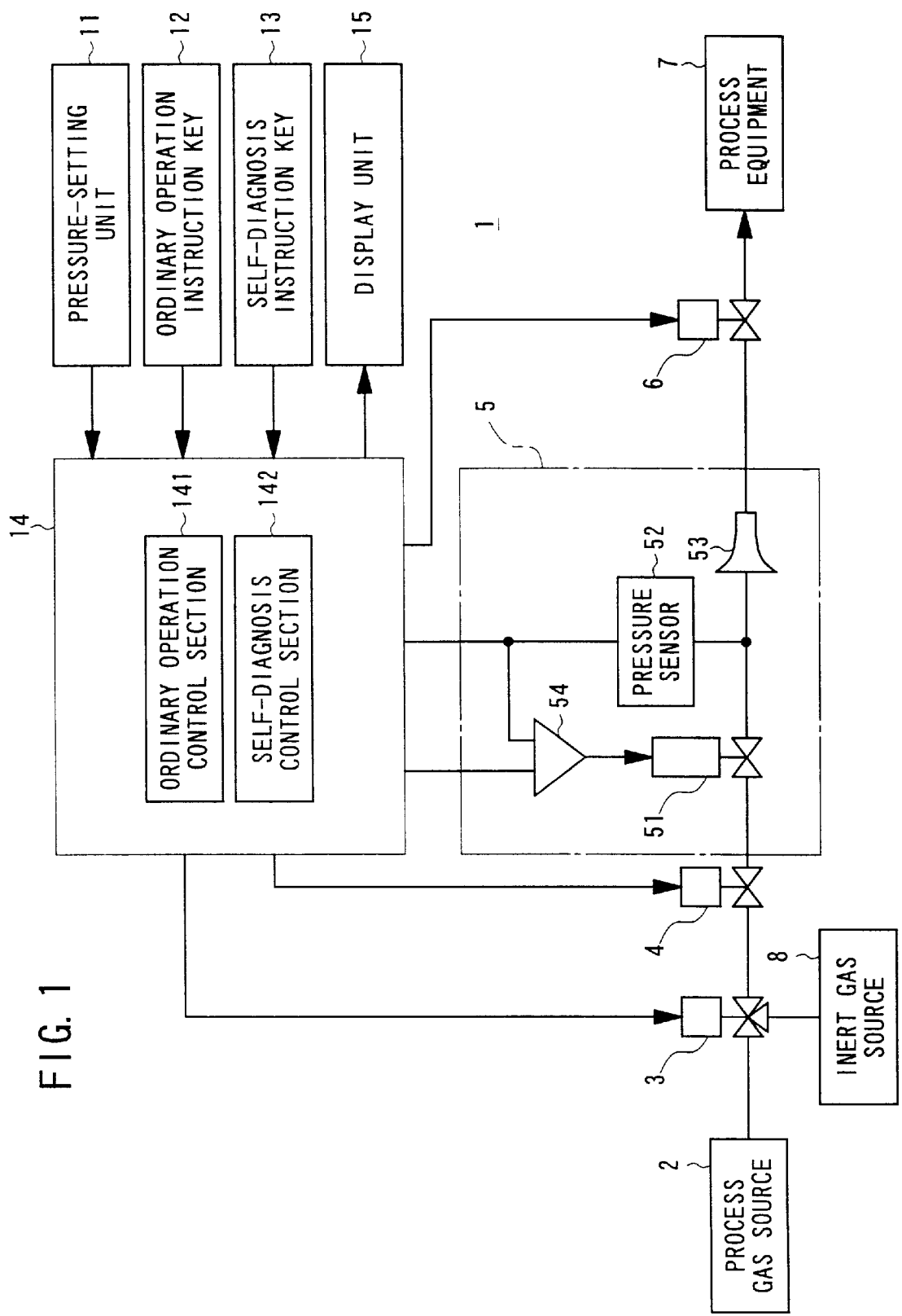
FIG. 1 shows a block diagram illustrating an exemplary arrangement of a mass flow control system to which a self-diagnosis method for a mass flow controller according to the present invention is applied.

FIG. 1 shows a block diagram illustrating an exemplary arrangement of a mass flow control system to which a self-diagnosis method for a mass flow controller according to the present invention is applied.

The mass flow control system 1 shown in FIG. 1 is designed such that a process gas, which is fed from a process gas source 2, is selectively introduced into a mass flow controller 5, for example, via a solenoid-operated shut off valve 4 disposed on the input side, and the process gas, which outflows via the mass flow controller 5, is led to a process equipment 7, for example, via a solenoid-operated shut off valve 6 disposed on the output side.

Usually, the shut off valve 4 disposed on the input side and the shut off valve 6 disposed on the output side are provided for the following purpose. That is, both of them are controlled to be in a shut off state when the mass flow controller 5 is exchanged, and the inflow of the process gas from the process gas source 2 to the mass flow controller 5 is shut off. Thus, the process gas is prevented from release, and any impurity gas is prevented from inflow into the side of the process equipment 7.

For example, a solenoid-operated three-way valve 3 is provided at an inflow port of the shut off valve 4. The three-way valve 3 is used to shut off the inflow of the process gas from the process gas source 2 to the mass flow controller 5 before closing the shut off valve 4 and the shut off valve 6. Simultaneously, the three-way valve 3 is selectively operated to allow an inert gas such as nitrogen gas from an inert gas source 8 to flow in the direction to pass through the shut off valve 4. Thus, the inert gas is used to purge the inside of the piping ranging from the three-way valve 3 to the process equipment 7, the inside of the mass flow controller 5, and the process equipment 7. However, details of this procedure is not referred to herein.

The mass flow controller 5 is a mass flow controller based on the pressure control system. The mass flow controller 5 comprises a pressure control valve 51 for being controlled for its opening degree in accordance with an electric signal, a pressure sensor 52 for detecting the pressure on the output side of the pressure control valve 51, an orifice 53 for allowing the process gas fed from the pressure control valve 51 to pass therethrough to establish the output side pressure of the pressure control valve 51, and a deviation detecting controller 54 for comparing an output signal from a control unit 14 described later on with a pressure output signal from the pressure sensor 52 to determine a difference or a deviation therebetween, and controlling the opening degree of the pressure control valve 51 such that the deviation between the output of the control unit 14 and the output of the pressure sensor 52 comes to be substantial zero, so that the pressure on the output side of the pressure control valve 51 is a pressure based on the output signal from the control unit 14. The process gas, which has passed through the orifice 53, is led via the shut off valve 6 to the process equipment 7.

The reason why the orifice 53 is provided will now be explained. Those disposed on the side of the process equipment 7 including, for example, the apparatus for producing thin films and the apparatus for dry etching in the production process for semiconductors are usually used at a negative pressure. Therefore, the orifice 53 is provided as a fixed throttle. Thus, the orifice 53 is used to establish the output pressure of the pressure control valve 51.

On the other hand, the control unit 14 is composed of a microcomputer, and it functionally comprises an ordinary operation control section 141 for controlling the ordinary operation, and a self-diagnosis control section 142 for performing self-diagnosis. Those supplied to the control unit 14 include a pressure output signal from the pressure sensor 52, an output signal of a pressure-setting unit 11 for setting the output side pressure of the pressure control valve 51, an instruction signal of an ordinary operation instruction key switch 12 for instructing the ordinary operation, and an instruction signal of a self-diagnosis instruction key switch 13. The control unit 14 selectively sends, to the deviation detecting controller 54, a control signal for controlling the output side pressure of the pressure control valve 51 to be a preset pressure given by the pressure-setting unit 11, or a control signal for controlling the pressure control valve 51 to be in the open state. The control unit 14 controls switching operation and opening/closing operation of the three-way valve 3, the shut off valve 4, the pressure control valve 51, and the shut off valve 6.

When the instruction of self-diagnosis is given, the control unit 14 sends a display signal to a display unit 15 to display whether the mass flow controller 5 is continuously usable or the mass flow controller 5 is required to be exchanged.

In the system constructed as described above, when the ordinary operation instruction is given by the ordinary operation instruction key switch 12, the ordinary operation control section 141 of the control unit 14 makes the following control. That is, the three-way valve 3 is switched to be in the state in which the process gas from the process gas source 2 passes in the direction to the shut off valve 4, and the shut off valve 4 and the shut off valve 6 are switched to be in the open state. Further, the opening degree of the pressure control valve 51 is controlled by the output signal of the deviation detecting controller 54 so that the output side pressure of the pressure control valve 51 is the preset pressure given by the pressure-setting unit 11. Thus, the process gas flows to the process equipment 7 at a flow rate based on the pressure set in the pressure-setting unit 11.

In this embodiment, the preset pressure in the pressure-setting unit 11 is set to be a primary pressure of the orifice 53 corresponding to a desired flow rate on the basis of a previously determined relationship between the output side pressure of the pressure control valve 51, i.e., the primary pressure of the orifice 53 and the flow rate of the process gas flowing through the orifice 53. When the pressure is set as described above, the primary pressure of the orifice 53 is controlled to be the preset pressure. Thus, the flow rate of the process gas passing through the orifice 53 is controlled to be the desired flow rate. That is, the flow rate of the fluid flowing through the orifice 53 is controlled by controlling the output pressure of the pressure control valve 51.

On the other hand, an unillustrated operation of inert gas purge is instructed immediately before a process objective such as a semiconductor wafer is exchanged after the predetermined process is completed. The three-way valve 3 is switched over to be in the following state on the basis of the instruction. That is, the process gas from the process gas source 2 is shut off, and the inert gas from the inert gas source 8 is allowed to pass in the direction to the shut off valve 4. Further, the shut off valve 4 and the shut off valve 6 are kept to be the open state, and the pressure control valve 51 is controlled to be in the open state. Thus, the process equipment 7 is purged with the inert gas.

Figure 2:
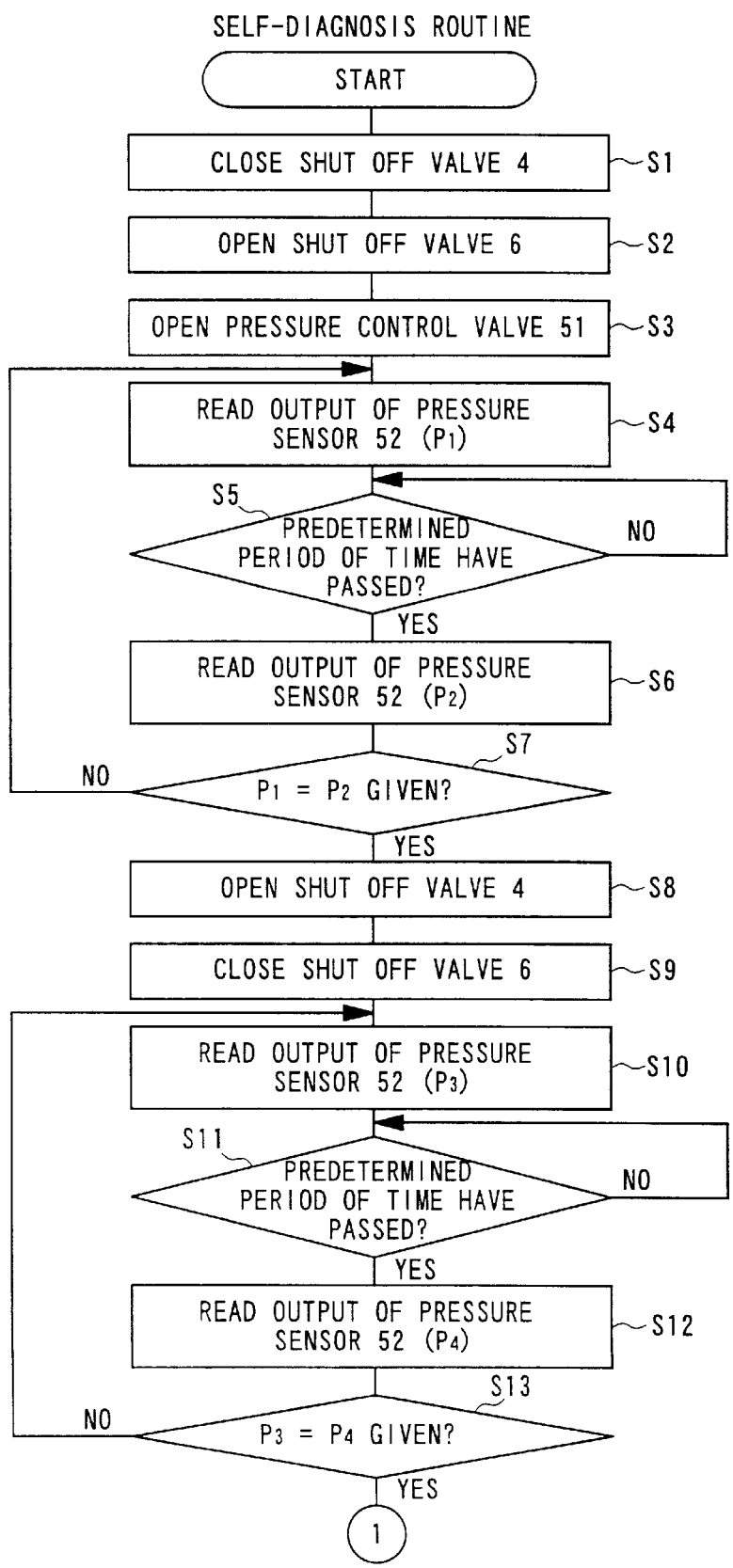
FIG. 2 shows a flow chart for illustrating the function of the mass flow control system to which the self-diagnosis method for the mass flow controller according to the present invention is applied.
Figure 3:
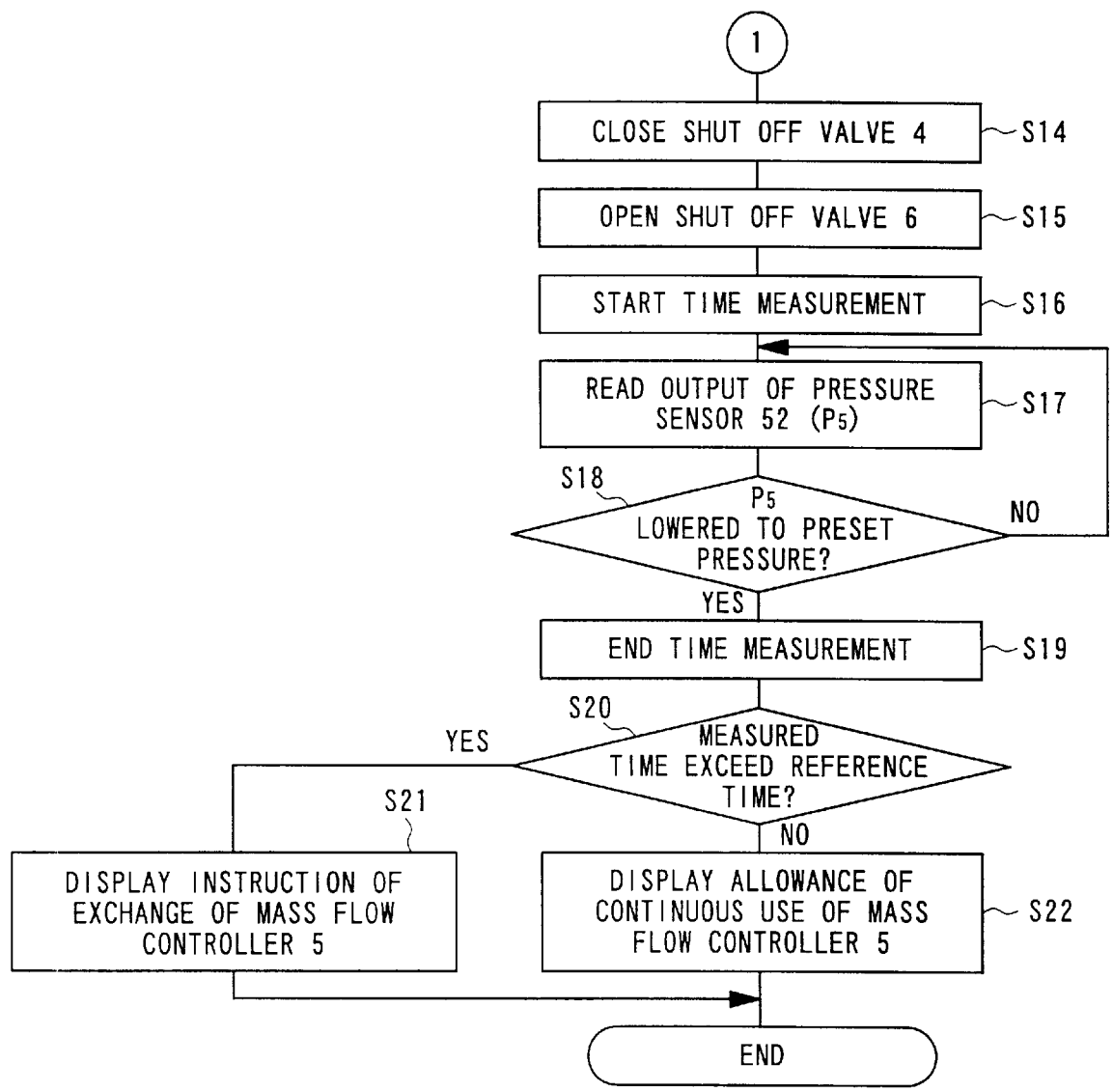
FIG. 3 shows a flow chart for illustrating the function of the mass flow control system to which the self-diagnosis method for the mass flow controller according to the present invention is applied.
Figure 4:
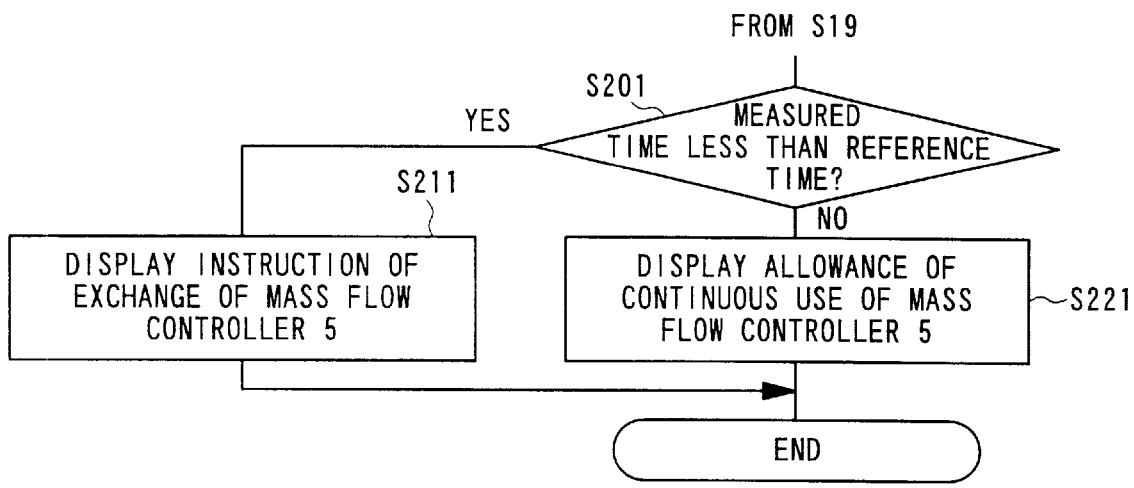
FIG. 4 shows a flow chart for illustrating the function of the mass flow control system to which the self-diagnosis method for the mass flow controller according to the present invention is applied.

Explanation will be made with reference to flow charts shown in FIGS. 2 to 4 for the operation effected when the self-diagnosis instruction is given by the self-diagnosis instruction key switch 13.

When the self-diagnosis instruction is given, the shut off valve 4 is controlled to be in the closed state under the control of the self-diagnosis control section 142 of the control unit 14 (step S1). Subsequently, the shut off valve 6 is controlled to be in the open state (step S2), and then the pressure control valve 51 is controlled to be in the open state (step S3). This state means that the inside of the piping ranging from the shut off valve 4 to the process equipment 7 has the pressure equivalent to the pressure on the side of the process equipment 7.

After the step S3 is executed, the pressure output signal from the pressure sensor 52 is read (step S4), and the system waits for the passage of a predetermined period of time (step S5). The pressure, which is based on the pressure output signal read in the step S4, is designated as P1. If the predetermined period of time has passed in the step S5, the pressure output signal from the pressure sensor 52 is read (step S6) to check whether or not the pressure output signal read in the step S4 is equal to the pressure output signal read in the step S6 (step S7). The pressure, which is based on the pressure output signal read in the step S6, is designated as P2. If it is not judged in the step S7 that the pressure output signals are equal to one another, the routine is executed again from the step S4 after the step S7.

The pressure in the piping ranging from the shut off valve 4 to the process equipment 7 fluctuates just after proceeding onto the step S4 after the step S3. The pressure in the piping ranging from the shut off valve 4 to the process equipment 7 will be stabilized through repeating a loop comprising the steps S4 through S7, so that such stabilized pressure can be detected in the step S7.

If it is judged in the step S7 that the pressure output signals are equal to one another (if it is judged that P1=P2 is given), it is denoted that the pressure in the piping ranging from the shut off valve 4 to the process equipment 7 is equal to the pressure on the side of the process equipment 7.

If it is judged in the step S7 that the pressure output signals are equal to one another, the shut off valve 4 is in the open state after the step S7 (step SB), and then the shut off valve 6 is in the closed state (step S9). After the step S9, the pressure output signal from the pressure sensor 52 is read (step S10), and then the system waits for the passage of a predetermined period of time (step S11). The pressure, which is based on the pressure output signal read in the step S10, is designated as P3. The predetermined period of time in the step S11 is selected to be a period of time which is five times as long as the charge time constant tn represented by the following expression (1), because of the following reason. That is, the pipework ranging from the process gas source 2 to the shut off valve 6 is approximately charged at the pressure of the process gas fed from the process gas source 2 within the period of time which is five times as long as the charge time constant tn.

$$tn = 5.21 \frac{V}{\kappa s} \sqrt{\frac{273}{T}} \quad (1)$$

In the expression (1), tn represents the charge time constant (s), V represents a volume (liter) of the pipework ranging from the process gas source 2 to the shut off valve 6, K represents an adiabatic exponent (=1.4), S represents an effective cross-sectional area (mm²) of the orifice 53, and T represents an absolute temperature (K).

After the step S11, the pressure output signal from the pressure sensor 52 is read (step S12) to check whether or not the pressure output signal from the pressure sensor 52 read in the step S10 is equal to the pressure output signal from the pressure sensor 52 read in the step S12, i.e., to check whether or not P3=P4 is given (step S13). The pressure, which is based on the pressure output signal read in the step S12, is designated as P4. If it is judged in the step S13 that the pressure P3 is not equal to the pressure P4, the routine is executed again from the step S10 after the step S13. Since the step S11 has been executed, it is usually judged in the step S13 that the pressure P3 is equal to the pressure P4.

In the similar way to the above, the pressure in the piping ranging from the shut off valve 4 to the shut off valve 6 will be stabilized through repeating a loop comprising the steps S10 through S13, so that such stabilized pressure can be detected in the step S13.

If it is judged in the step S13 that the pressure P3 is equal to the pressure P4, i.e., P3=P4, it is denoted that the pipework ranging from the process gas source 2 to the shut off valve 6 is charged with the pressure of the process gas supplied from the process gas source 2. This fact means that the pipework ranging from the process gas source 2 to the shut off valve 6 acts as a measuring tank for self-diagnosis.

If it is judged in the step S13 that the pressure P3 is equal to the pressure P4, the shut off valve 4 is in the closed state (step S14). Subsequently, the shut off valve 6 is controlled to be in the open state (step S15), and then the time measurement is started (step S16). The pressure output signal from the pressure sensor 52 is read (step S17). The pressure, which is based on the pressure output signal read in the step S17, is designated as P5. After the step S17, it is checked whether or not the pressure based on the pressure output signal from the pressure sensor 52 is lowered to the previously determined preset pressure (step S18). If it is not judged that the pressure P5 is lowered to the previously determined preset pressure, the routine is executed again from the step S17. If it is judged in the step S18 that the pressure P5 is lowered to the previously determined preset pressure, the time measurement comes to an end (step S19).

Therefore, the time measurement is performed to determine the period of time required to lower the pressure in the pipework ranging from the process gas source 2 to the shut off valve 6 charged at the pressure of the process gas supplied from the process gas source 2, to the previously determined preset pressure, as a result of the execution of the step S15 to the step S19.

In this embodiment, the relationship between the previously determined preset pressure and the reference time is defined on the basis of the following expression (2).

$$td = \frac{2\kappa}{\kappa - 1} \left[ \left( \frac{P_H + 0.1013}{P + 0.1013} \right)^{\frac{1}{2\left(1 - \frac{1}{\kappa}\right)}} - 1 \right] tn \quad (2)$$

In the expression (2), tn represents the charge time constant (s), $P_H$ represents an initial value of the process gas pressure (MPaG) in the pipework ranging from the process gas source 2 to the shut off valve 6, P represents the gas pressure in the pipework ranging from the process gas source 2 to the shut off valve 6 after opening the pipework, which is the previously determined preset pressure (MPaG) described above, td represents the reference time (s) required to lower the gas pressure in the pipework ranging from the process gas source 2 to the shut off valve 6 after opening the pipework, to the previously determined preset pressure, and K represents an adiabatic exponent (=1.4).

After the execution of the step S19, it is checked whether or not the measured time obtained upon completion of the time measurement exceeds the previously determined reference time (td) (step S20). If it is judged in the step S20 that the measured time exceeds the reference time td, the judgement is made because of the following reason. That is, the effective cross-sectional area of the orifice 53 is decreased, for example, due to deposition of solid matters caused by the passage of the process gas, and the period of time, during which the gas pressure in the pipework ranging from the process gas source 2 to the shut off valve 6 after opening the shut off valve 6 is lowered to the previously determined preset pressure, is longer than the reference time td which is defined assuming that the effective cross-sectional area of the orifice is not changed. The exchange instruction for instructing that the mass flow controller 5 should be exchanged is displayed on the display unit 15 (step S21). Thus, the self-diagnosis is completed.

If it is judged in the step S20 that the reference time td is not exceeded, the judgement is made because of the following reason. That is, the effective cross-sectional area of the orifice 53 is not decreased yet to such a degree that the mass flow controller 5 should be exchanged, and the period of time, during which the gas pressure in the pipework ranging from the process gas source 2 to the shut off valve 6 after the opening operation is lowered to the previously determined preset pressure, is shorter than the reference time. The allowance of continuous use indicating that the mass flow controller 5 may be continuously used is displayed on the display unit 15 (step S22). Thus, the self-diagnosis is completed.

In this case, the pressure on the side of the process equipment 7 is negative as described above. However, the pressure in the pipework charged with the pressure of the process gas supplied from the process gas source 2 is not less than 0.1 MPaG. The differential pressure between the inlet and the outlet of the orifice 53, which is obtained when the shut off valve 6 is open, is not less than the critical differential pressure. The velocity of flow of the fluid flowing through the orifice 53 is the velocity of sound. The flow rate through the orifice 53 is proportional to the effective cross-sectional area of the orifice 53.

The embodiment of the present invention utilizes the relationship described above. The pipework ranging from the process gas source 2 to the shut off valve 6 is used as the measuring tank for the self-diagnosis. The process gas from the process gas source 2 is charged into the measuring tank which is formed by the pipework as described above. The charged process gas is released through the orifice 53. The pressure in the pipework charged with the process gas pressure is lowered corresponding to the flow rate of passage through the orifice 53. It is judged whether or not the decrease in effective cross-sectional area arrives at the degree at which the mass flow controller 5 needs to be exchanged, depending on the speed of the pressure decrease, i.e., the period of time during which the pressure in the measuring tank formed by the pipework is lowered to the predetermined pressure. The self-diagnosis requires no new component of hardware except for the system necessary for the ordinary operation.

The foregoing embodiment is illustrative of the case in which the process gas itself is used for the self-diagnosis. However, it is allowable to use the inert gas in place of the process gas. In this case, when the self-diagnosis is started, the three-way valve 3 is used to make changeover so that the inert gas is introduced into the shut off valve 4, followed by performing the self-diagnosis.

In some cases, the orifice 53 may be eroded by the process gas. In such a case, as shown in FIG. 4, it is checked after the step S19 whether or not the measured time is less than the reference time (step S201). If it is judged that the measured time is less than the reference time, then the exchange instruction for instructing that the mass flow controller 5 should be exchanged is displayed on the display unit 15 (step S211), and the self-diagnosis is completed. If it is judged that the measured time is not less than the reference time, then the allowance of continuous use indicating that the mass flow controller 5 may be continuously used is displayed on the display unit 15 (step S221), and the self-diagnosis is completed.

The step S211 is executed when the effective cross-sectional area of the orifice 53 becomes too large due to the erosion. The step S221 is executed when the effective cross-sectional area of the orifice 53 becomes large, but the mass flow controller 5 can be still used.

Next, explanation will be made for a modified embodiment of the mass flow control system 1 according to the embodiment of the present invention described above.

Figure 5:
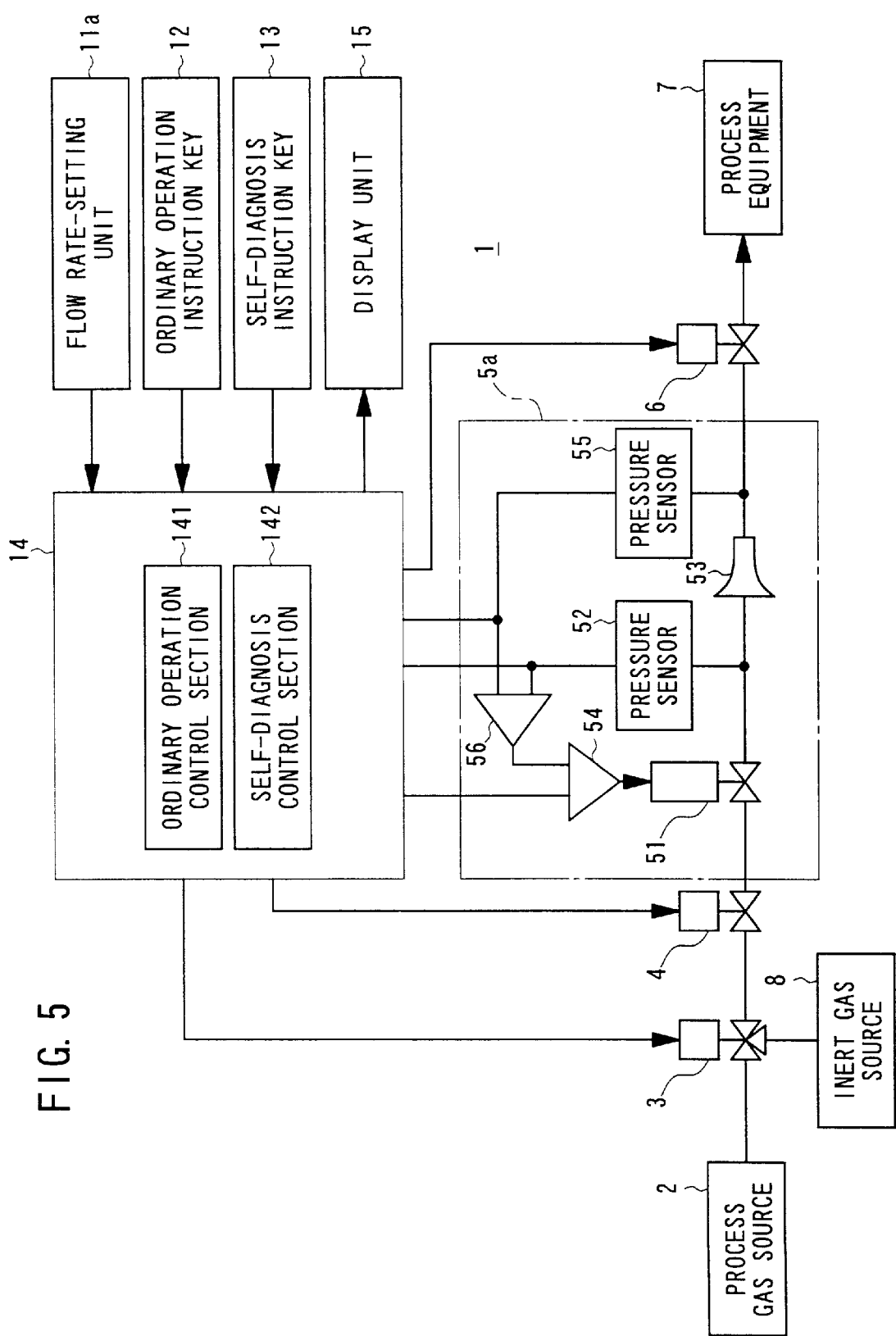
FIG. 5 shows a block diagram illustrating an exemplary arrangement of a modified embodiment of a mass flow control system to which a self-diagnosis method for a mass flow controller according to the present invention is applied.

FIG. 5 shows a block diagram illustrating an arrangement of the modified embodiment of the mass flow control system 1 according to the embodiment of the present invention.

In the modified embodiment concerning the embodiment of the present invention, a mass flow controller 5a is used in place of the mass flow controller 5. The mass flow controller 5a is newly provided with a pressure sensor 55 for detecting the secondary pressure of the orifice 53, and a differential amplifier 56 for calculating a difference between a pressure output signal from the pressure sensor 52 and a pressure output signal from the pressure sensor 55, in addition to the components of the mass flow controller 5. An output of the differential amplifier 56 is supplied to the deviation detecting controller 54, in place of the 5 pressure output signal from the pressure sensor 52. The pressure-setting unit 11 is replaced with a flow rate-setting unit 11a for setting the gas flow rate. The other components are the same as those of the mass flow control system 1 concerning the embodiment of the present invention shown in FIG. 1.

The modified embodiment of the embodiment of the present invention resides in the system based on the use of the two pressure sensors, in which the mass flow controller 5a is provided with the pressure sensors 52, 55. Even when the process equipment 7 has a predetermined positive pressure other than the negative pressure, the secondary pressure of the orifice 53 is detected by the pressure sensor 55. The pressure loss caused by the orifice 53 is detected by the differential amplifier 56. The output of the differential amplifier 56 corresponds to the flow rate of the gas flowing through the orifice 53. The pressure control valve 51 functions as a flow rate control valve. During the ordinary operation control, it is possible to control the flow rate of the process gas allowed to flow to the process equipment 7.

When the self-diagnosis control is performed, the pressure control valve (flow rate control valve) 51 is open. The self-diagnosis can be performed on the basis of the period of time required to lower the pressure output signal from the pressure sensor 52 to the predetermined pressure, in the same manner as in the embodiment concerning the present invention.

As explained above, according to the self-diagnosis method for the mass flow controller according to the present invention, the gas having the predetermined pressure is charged into the pipework ranging between the first and second shut off valves by opening the first shut off valve and closing the second shut off valve. The gas is released by opening the second shut off valve in the state in which the first shut off valve is closed. The self-diagnosis can be performed on the basis of the period of time required to lower the pressure on the inflow side of the fixed throttle to the predetermined pressure as a result of the release. In this process, the pipework ranging between the first and second shut off valves functions as the measuring tank. The first and second shut off valves are those ordinarily equipped, for example, in order to remove the mass flow controller from the pipework when the mass flow controller is exchanged. Accordingly, the self-diagnosis can be performed by using the constitutive equipment necessary to be equipped in the ordinary operation state, without any necessity of addition or removal of any special hardware for the self-diagnosis.

Further, according to the self-diagnosis method for the mass flow controller according to the present invention, if the period of time, which is required to lower the detection pressure detected by the pressure sensor to the previously determined detection pressure when the gas is allowed to outflow, exceeds the reference time, this situation is displayed. If the period of time, which is required to lower the detection pressure detected by the pressure sensor to the previously determined detection pressure when the gas is allowed to outflow, is less than the reference time, this situation is displayed. Thus, it is possible to know the result of the self-diagnosis on the basis of the display.

What is claimed is:

1. A self-diagnosis method for a mass flow controller comprising a control valve for controlling a pressure or for controlling a flow rate, a first shut off valve for performing opening/closing operation on an inflow side of said control valve, a fixed throttle disposed on an outflow side of said control valve for establishing an output pressure on an outflow side of said control valve, a pressure sensor for detecting a pressure on an inflow side of said fixed throttle, and a second shut off valve for performing opening/closing operation on an outflow side of said fixed throttle, where said control valve, said first shut off valve, said fixed throttle, and said second shut off valve are provided in a pipework for supplying a process gas from a process gas supply source to a process equipment, said self-diagnosis method comprising the steps of using said second shut off valve to close said outflow side of said fixed throttle in a state in which said control valve has a previously determined opening degree;

using said first shut off valve to open said inflow side of said control valve so that a previously determined process gas having a predetermined pressure is charged via said first shut off valve into a pipework ranging from said first shut off valve to said second shut off valve;

using said first shut off valve to close said inflow side of said control valve for a gas-charging period which ranges from a point of time at which said first shut off valve is opened to a point of time at which said first shut off valve is closed, said gas-charging period being about five times as much as a charge time constant of said pipework ranging from said first shut off valve to said second shut off valve;

using said second shut off valve to open said outflow side of said fixed throttle so that said process gas charged in said pipework is allowed to cause outflow; and performing diagnosis for said mass flow controller on the basis of a period of time required to lower a detection pressure detected by said pressure sensor to a previously determined detection pressure as a result of said outflow.

2. The self-diagnosis method for said mass flow controller according to claim 1, wherein if said period of time, which is required to lower said detection pressure detected by said pressure sensor to said previously determined detection pressure when said gas is allowed to outflow, exceeds a reference time, this situation is displayed.

3. The self-diagnosis method for said mass flow controller according to claim 1, wherein if said period of time, which is required to lower said detection pressure detected by said pressure sensor to said previously determined detection pressure when said gas is allowed to outflow, is less than a reference time, this situation is displayed.

4. The self-diagnosis method for said mass flow controller according to claim 1, wherein said fixed throttle is an orifice.

* * * * *